Figure 3:
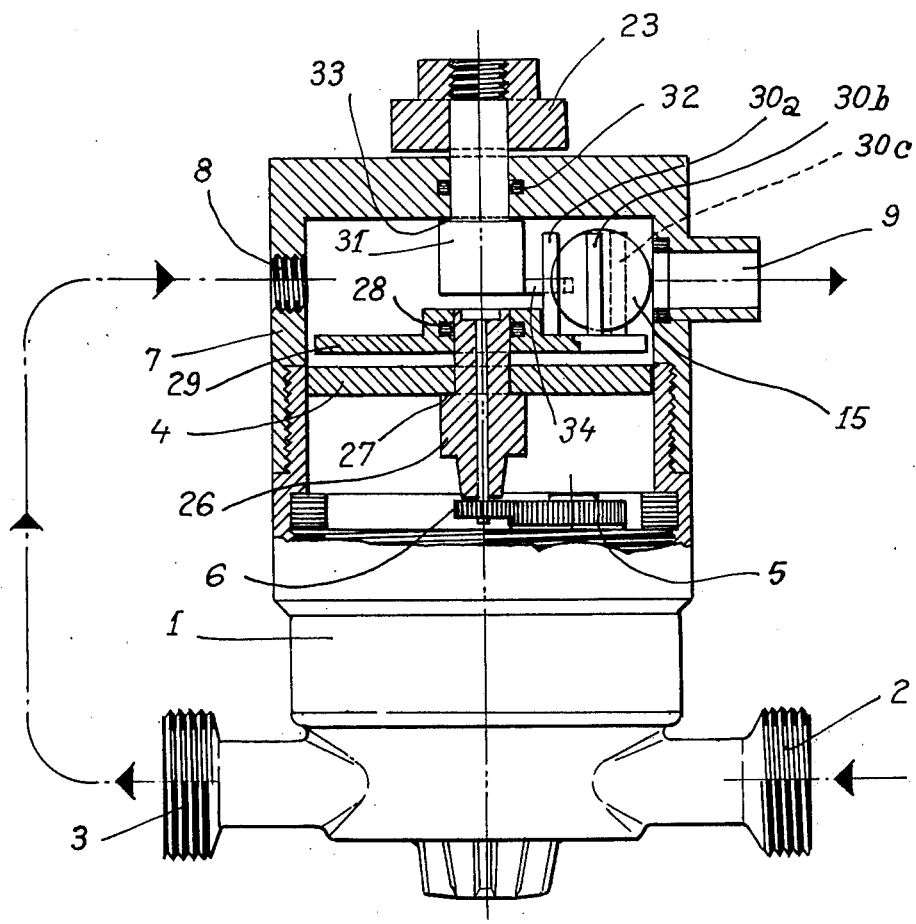

United States Patent [19]
Piat

[11] 4,032,042
[45] June 28, 1977

[54] APPARATUS FOR COMPUTING AND METERING LIQUID DISCHARGES

[76] Inventor: Moise Piat, Residences Clair Horizon, Bat. 1 Bloc A Avenue Joseph Giordan, 06000 Nice, France

[22] Filed: May 10, 1976

[21] Appl. No.: 684,894

[30] Foreign Application Priority Data
Oct. 2, 1975 France .................. 75.30740

[52] U.S. Cl. ................................................ 222/20
[51] Int. Cl.² ........................................ B67D 5/30
[58] Field of Search ............... 222/20, 17, 18, 19

[56] References Cited
UNITED STATES PATENTS
2,998,161  8/1961  Quinlan .................. 222/20

Primary Examiner—Stanley H. Tollberg
Assistant Examiner—Hadd Lane
Attorney, Agent, or Firm—Young & Thompson

[57] ABSTRACT

A computing and metering device allows only predetermined controllable quantities of a liquid to be discharged from a liquid outlet aperture. A turbine flow meter drives a metering means having a rotatable plate which carries a ball that is located in such a way as to block the arrival of the liquid when the plate is moved through a given angle of revolution from a position which is predetermined by a setting component. The flow meter and the metering means are disposed in separate chambers and are in communication with each other via an external duct through which the whole of the liquid flow passes from one chamber into the other chamber.

8 Claims, 4 Drawing Figures

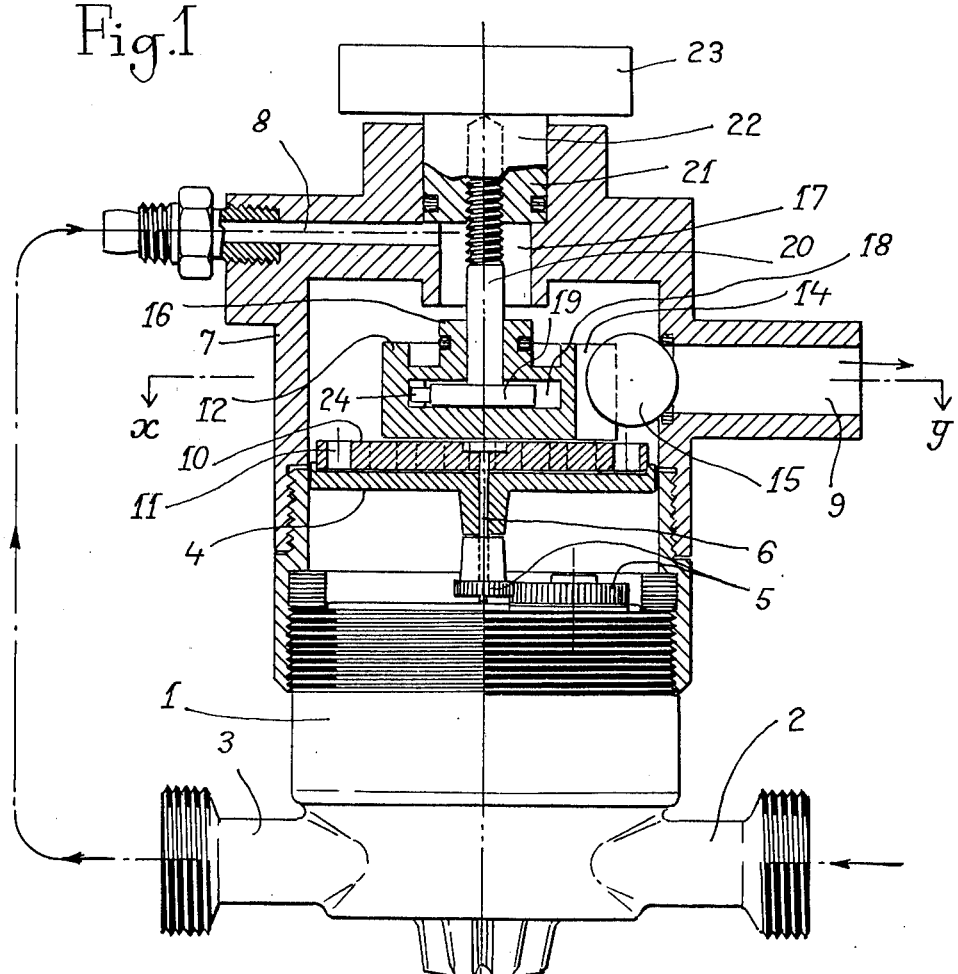
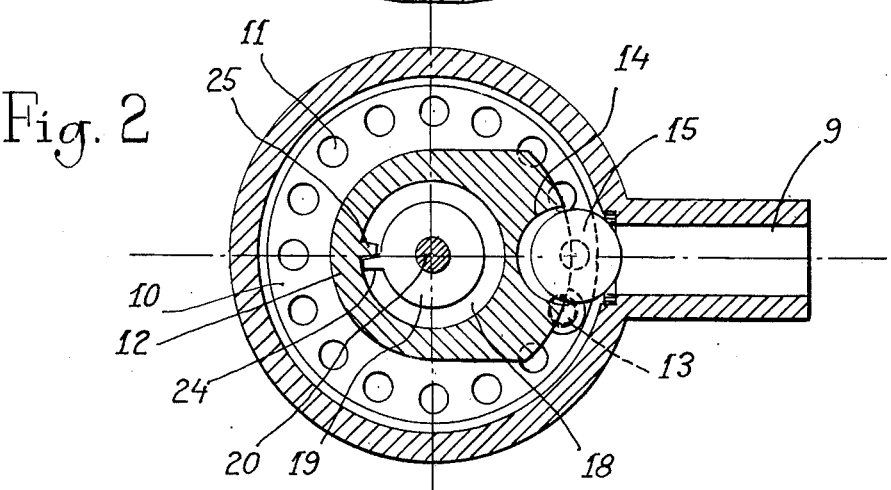

APPARATUS FOR COMPUTING AND METERING LIQUID DISCHARGES

The invention relates to devices for computing and metering fluid discharges in predetermined and adjustable quantities.

The device comprises the combination of a turbine flowmeter of a known type and a metering device. According to the invention, the metering device is characterized by incorporating a turning element, driven in rotation by the shaft of the flowmeter, and arranged so as to interrupt the arrival of the fluid when said turning element has passed through a predetermined fraction of a revolution.

In accordance with a second feature of the invention, the turning element comprises a disc or plate, having near its periphery, a number of holes, into one of which a finger of a control plunger may be introduced, means being provided enabling the plunger to be raised and block the arrival of fluid when the plate has turned through a given fraction of a revolution.

In accordance with yet another feature of the invention, the raising of the plate is effected by the pressure of the fluid itself in the chamber that contains it, which pressure is built up when an obturating device such as a ball, located radially in the plate, closes an outlet channel from the said chamber.

Another preferred feature of the invention provides that the premature rise of the plunger is prevented by giving the outlet channel of the chamber a greater cross section than that of its inlet channel.

Figure 4:
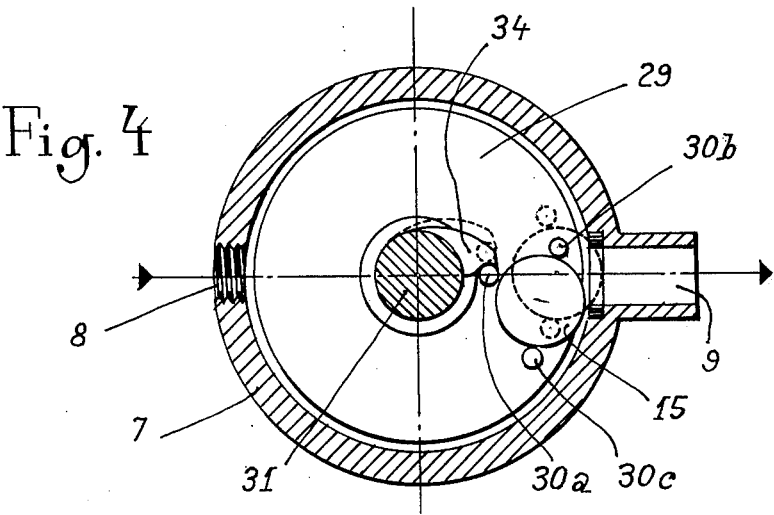

Other features and advantages of a computing and metering device in accordance with the invention will be seen from the following description of two of the embodiments of the invention made with reference to the accompanying drawings in which:

FIGS. 1 and 2 illustrate a first embodiment of the invention, FIG. 1 in vertical section and FIG. 2 in horizontal section drawn on the line X—Y of FIG. 1; and FIGS. 3 and 4 illustrate a second embodiment of the invention; FIG. 3 in longitudinal section and FIG. 4 in transverse section drawn on the line X—Y of FIG. 3.

The computer and metering device shown in FIGS. 1 and 2 comprises in combination: a flowmeter of known type, and a volumetric metering device in accordance with the invention.

The flowmeter has a cylindrical chamber 1, provided with an entry aperture 2 for the fluid and an outlet aperture 3; chamber 1 is closed in its upper part by a partition 4 and contains a bladed turbine of a known type, not shown, which drives, via a train of gears 5, a vertical shaft 6 passing through the partition 4.

The volumetric metering device comprises a casing 7 mounted on the chamber 1 of the flowmeter, and incorporating an entry duct 8, and an outlet duct 9 which are linked to the inlet aperture 2 of the flowmeter. The cross section of duct 9 is significantly greater than that of duct 8. At the bottom of casing 7 there is a circular plate 10, keyed to the shaft 6 of the flowmeter and as a result driven to rotate by this. Plate 10 is pierced by a number of holes such as 11, distributed near to the periphery of the plate.

In casing 7, above the rotating plate 10 there is a piston 12, which may be lifted and turned manually as will be later explained, and which incorporates a finger 13 that, in the lowered position of the piston 12, engages one of the holes 11, chosen as desired, of the rotating plate 10. The piston 12 has lateral recess 14 in which a ball 15 is located, resting upon the plate 10 and capable of blocking the outlet duct 9 of the casing 7. Finally the piston 12 has on its upper part a shoulder 16, which in the raised position of the piston abuts against the wall of an axial duct 17 extending the lateral entry duct 8 for the liquid, thus stopping the arrival of liquid by this duct.

The manipulation of the piston 12 is effected in the following manner: the piston incorporates a circular cavity 18 which locates the head 19 of an axial rod 20 screwed into a plug 21 able to slide in an upper chamber 22 of the casing 7. Rod 20 is integral with an actuating knob 23. The head 19 of the rod 20 carries a peg 24 which abuts against a stop 25 in the circular cavity 18.

Operation of the device is as follows: it is assembed that at the start the rod 20 and piston 12 have been turned in such a way that the lateral recess 14 and hence the ball 15 are not facing the outlet duct 9 since the assembly of rod 20 and pison 12 has been lowered so as to engage the finger 13 of the piston 12 in one of the holes 11 of the plate 10. Under these conditions, the liquid circulates through the duct 8, the chamber 17 opened by the shoulder 16 of the piston 12, and the outlet duct 9; the piston 12 does not rise as the pressure within the casing 7 is low due to the outlet duct 9 being of greater section than the inlet duct 8.

Form the outlet duct 9 the fluid is led, as had been said above, to the entry aperture 2 of the flowmeter 1 and leaves it by the outlet aperture 3. In passing through the flowmeter the fluid causes the bladed turbine to rotate, and thus drives and rotates, via the shaft 6, the plate 10 of the volumetric metering device. In rotating, plate 10 will rotate the piston 12 via coupling comprising the finger 13 located in one of its holes 11, piston 12 will continue to rotate until its lateral recess 14, and therefore the ball 15 located therein, arrives in frnt of and blocks outlet duct 9. At this moment. the liquid arriving in the casing 7 is not longer able to escape, and is subjected to an increase in pressure. The increased pressure acts on the lower face of the piston 12 causing it to rise, and in consequence block chamber 17, interrupting the flow of fluid through the duct 8. It will be understood that the more angularly remote the combination of the lateral recess 14 and the ball 15 from the outlet duct 9 initially, the longer time for which the plate 10 will have to turn before the ball 15 blocks the duct 9, and consequently the greater will be the quantity of fluid discharged by the device.

Thus is it possible to select as desired, by turning the knob 23, which of the holes 11 in the plate 10 receives the finger 13 and so regulate in a corresponding manner the quantity of fluid that will be discharged before closure of the inlet duct 8.

The setting knob 23 may carry markings corresponding to different desired metered quantity of fluid. When the ball 15 is facing the outlet duct 9, the markng opposite a reference mark will be "zero", and when the piston 12 is engaged on the plate in such a way that this latter has made almost a complete turn, the graduation will indicated the maximum value of the metered quantity to be discharged. If for example the parameters of the metering device are such that this maximum metered quantity is 100 liters, the knob 23 can be graduated in as many fractions of 100 liters as the plate 10 carries holes 11. The number of different metered quantities that it is thus possible to preset in this way depends only upon the number of holes it is possible for form in the plate 10.

Equipment in accordance with the invention may be disposed such that when the metered quantity of liquid has been discharged and the piston 12 has blocked communication between the duct 8 and casing 7, the duct 8, instead of being simply closed is placed in communication with an auxiliary bypass outlet, thus making it possible to send the liquid to another device; it suffices to this end to furnish the piston 12 with a supplementary chamber which, in the uppermost position of the said piston, opposes and auxiliary outlet passing through the wall of the upper part of casing 7, thus linking the duct 8 directly to the auxiliary outlet, without communication with the duct 9. In this way it is possible for several metering devices to be supplied in series.

In what has just been disclosed, expressions such as "lower", "upper", etc, have been employed, but this is only in relation to the figures given by way of example, and it is emphasized that the equipment in accordance with the invention can function in any attitude.

Equipment has been described in which fluid arrives through the duct 8 and then leaves the casing 7 though the duct 9, to enter flowmeter 1 through inlet 2 and leave it through aperture 3. It is obvious that the liquid circuit may be different, that is to say that the liquid first of all arrives in the flowmeter 1 through the inlet 2, then leaves the flowmeter 1 through the aperture 3, to enter then the casing 7 by way of the duct 8 and leave through the outlet duct 9. Under these conditions the liquid supply duct is the duct 2, while the duct for utilization of metered and computed liquid is the duct 9.

The invention likewise has as an object a second, simpler form of embodiment of a computing and metering device.

This computing and metering device comprises, as in the first form of embodiment, a lower chamber in which is housed a turbine of a known type driven in rotation by fluid flow in the chamber, and an upper chamber, separated by a partition from the lower chamber, and in which the metering unit proper is located, the metering unit comprises a plate that can be driven by the turbine of the computing device and carries a ball for blocking the liquid outlet orifice.

The differences between the computing and metering device in accordance with the second form of embodiment and that in accordance with the first form are the following:

The partition between the two chambers is penetrated by a spindle that can be driven by the turbine shaft through the medium of gears, that plate of the metering device being fixed on the upper part of this spindle through the medium of a circular joint. This assembly is arranged in such a way that when the spindle turns it drives the plate through the medium of the joint, while if the plate is subjected to impulsion it turns around the spindle without driving this latter, because of the inertia of the linking gear train between the spindle and the turbine.

Furthermore, the plate carries a certain number of bars forming a cage at the height of the liquid discharge aperture, this cage freely enclosing the ball. The spacing between the bars is sufficiently large for the ball to be able to bear against the said aperture.

Finally, a rod linked to the control knob carries a finger that can abut against one of the bars of the cage, in such a way that the rotation of the knob makes it possible to turn the cage of the plate by an desired angle around the axis of the control rod, which allows the variation of the distance between the ball located in the cage and the liquid outlet aperture by the value desired, and consequently to regulate the liquid volume metered.

As has been said earlier, the FIGS. 3 and 4 represent a second form of embodiment, respectively in a longitudinal section and in a transverse section at the height of the cage control finger.

In these figures, 1 identifies as before the chamber of the computing device and 7 the casing of the associated metering device, separated by a partition 4. The liquid enters the computing device via an aperture 2 and leaves it via an aperture 3 to enter the metering device at 8 and depart from it at 9. The computing device incorporates a known turbine not shown, drivings a longitudinal shaft 6 via gears 5.

In accordance with the invention, the shaft 6 carries a spindle 26 that passes through the partition 4 and is supported by a shoulder 27. The part of this spindle which is within the casing 7 of the metering device incorporates a circular joint 28 on which is fixed a plate 29 which carries three bars 30a, 30b, 30c, forming a cage in which the ball 15 is located at the height of the outlet aperture 9.

Furthermore, a control rod 31 passes through the upper wall of the casing 7 in a sealed joint 32. This rod is supported by a shoulder 33, and carries at its upper part the control knob 23 and on its lower part a lateral finger 34 able to come into contact with one of the bars 30a, 30b, 30c of the cage.

The operation of this device is clearly apparent. To effect regulation of the volume of liquid to be discharged, knob 23 is turned through the desired angle, which, through the intermediary of the finger 34 causes the cage to turn through a corresponding angle, thus moving the ball 15 the desired distance from the liquid outlet 9. During the operation, plate 29 carrying the bars 30a, 30b, 30c turns around the joint 28 of the spindle 26, the latter not being driven in this movement, as has been explained, because of the inertia of the gears 5.

On the other hand, when setting has been effected and the liquid is allowed to flow into the computing device, the turbine drives the spindle 26 and the plate 29 as a result of the adhesion of the joint 28. This plate turns until the ball 15, which had been moved angularly away from the outlet aperture 9, again finds itself opposite the said aperture, against which it will be applied by the pressure of the liquid, so interrupting the flow of this latter after the volume determined by the movement of the knob has been discharged.

It can be seen that the construction of the apparatus above described is both simple and robust, and that for this reason its operation is particularly certain.

It will likewise be noted that in the variant shown in FIGS. 3 and 4, the control knob 23 driving the lateral finger 24 may only be moved in rotation in the same direction as that of the plate 29 and that, by means of a non-return device, for example a pawl (not shown in the figures). Thus the lateral finger 24 will always position itself behind the bar 30a to locate it. The working flowmeter then only drives the plate 29. The flowmeter will thus not be rendered inaccurate through the driving of the whole of the setting mechanism, and will operate under the normal precision conditions of a flowmeter.

What is claimed is:

1. A computing and metering device allowing only predetermined controllable quantities of a liquid to be discharged from a liquid outlet aperture, comprising a turbine flowmeter, metering means driven by said flowmeter and having a rotatable plate which carries a ball located in such a way as to block the arrival of the liquid when the said plate has moved through a given angle of revolution from a position predetermined by a setting component, the flowmeter and the metering means being disposed in separate chambers and being in communication with one another such that the whole of the flow passing through one said chamber then passes into the other chamber via an external duct.

2. A device as claimed in claim 1, wherein the two chambers containing the flowmeter and the metering means respectively are superposed.

3. A device as claimed in claim 1, wherein the plate is fixed through the intermediary of a circular joint on a spindle formed integrally with an output shaft from the flowmeter, the spindle driving the plate via said joint when the flowmeter rotates.

4. A device as claimed in claim 1, wherein the ball is located in a cage formed of bars integral with the plate, the spacing of which is sufficient to allow the ball to be applied against the liquid outlet aperture under the effect of liquid pressure.

5. A device as claimed in claim 1, wherein the metering means comprises an axial rod passing in a sealed manner through an upper wall of the metering means and carrying an external control knob and an internal lateral finger for abutment against one of the bars of the cage for the ball to cause the cage to turn and therefore also the plate whereby the ball moves away from the liquid outlet aperture by a distance corresponding to the volume of liquid that it is desire to meter.

6. A device as claimed in claim 5, wherein the turbine flowmeter drives only the plate carrying the ball with which it is integrally formed and operation of the flowmeter is independent from that of the setting means constituted by the control knob and the finger.

7. A device as claimed in claim 6, wherein the control knob can be rotated only in the same direction as the plate whereby the finger always becomes located behind the bar and therefore the ball and this by means of a pawl.

8. A device as claimed in claim 1 and a piston which blocks the inlet duct of the second chamber under the action of the pressure which is exerted upon it when the rotation of the metering means has brought the ball opposite the outlet of the said chamber, therebeing a supplementary chamber which is placed in communication with the liquid entry duct when the piston bears upon its seating, the discharge of the said supplementary chamber communicating with the inlet of a further metering means.

* * * * *